(12) United States Patent
Hsu

(10) Patent No.: US 11,391,320 B2
(45) Date of Patent: Jul. 19, 2022

(54) ROTARY SHAFT LINK ASSEMBLY SHIELD STRUCTURE

(71) Applicant: FIRST DOME CORPORATION, New Taipei (TW)

(72) Inventor: An Szu Hsu, New Taipei (TW)

(73) Assignee: Fositek Corporation, New Taipei (TW)

( * ) Notice: Subject to any disclaimer, the term of this patent is extended or adjusted under 35 U.S.C. 154(b) by 78 days.

(21) Appl. No.: 16/845,507

(22) Filed: Apr. 10, 2020

(65) Prior Publication Data

US 2021/0199153 A1 Jul. 1, 2021

(30) Foreign Application Priority Data

Dec. 26, 2019 (TW) ................................. 108147951

(51) Int. Cl.
| | |
|---|---|
| *E05D 3/12* | (2006.01) |
| *F16C 11/04* | (2006.01) |
| *E05D 11/00* | (2006.01) |
| *G06F 1/16* | (2006.01) |
| *E05D 11/08* | (2006.01) |

(52) U.S. Cl.
CPC .............. *F16C 11/04* (2013.01); *E05D 3/122* (2013.01); *E05D 11/0054* (2013.01); *G06F 1/1681* (2013.01); *E05D 11/082* (2013.01); *E05Y 2900/606* (2013.01)

(58) Field of Classification Search
CPC ... B65D 63/04; G06F 1/1681; E05D 11/0054; E05D 3/122; F16C 11/04
See application file for complete search history.

(56) References Cited

U.S. PATENT DOCUMENTS

| | | | | |
|---|---|---|---|---|
| 9,874,048 B1* | 1/2018 | Hsu | .......................... | G09F 9/301 |
| 10,209,743 B1* | 2/2019 | Hsu | ....................... | G06F 1/1681 |
| 10,591,959 B1* | 3/2020 | Hsu | ....................... | G06F 1/1681 |
| 10,599,189 B1* | 3/2020 | Hsu | ....................... | G06F 1/1681 |
| 10,664,021 B1* | 5/2020 | Hsu | ....................... | H04B 1/3888 |
| 10,824,197 B1* | 11/2020 | Hsu | ....................... | G06F 1/1616 |

(Continued)

FOREIGN PATENT DOCUMENTS

| | | |
|---|---|---|
| CN | 109578776 A | 4/2019 |
| TW | M503491 U | 6/2015 |

(Continued)

*Primary Examiner* — Jason W San
(74) *Attorney, Agent, or Firm* — Rosenberg, Klein & Lee

(57) ABSTRACT

A rotary shaft link assembly shield structure is connected between a first support and a second support of two articles. The rotary shaft link assembly structure has a rotary shaft assembly, at least one flexible shield plate and at least one synchronous rotational assembly. The rotary shaft assembly has multiple connection members. Each connection member is correspondingly formed with at least one hollow section. The synchronous rotational assembly passes through the hollow sections of the connection members to respectively connect with the first and second supports. The flexible shield plate also passes through the hollow sections of the respective connection members. A middle section of the flexible shield plate is bent in reverse direction and two sides of the flexible shield plate respectively shield two surfaces of the synchronous rotational assembly.

14 Claims, 5 Drawing Sheets

(56) References Cited

U.S. PATENT DOCUMENTS

| | | | | |
|---|---|---|---|---|
| 2016/0160549 A1* | 6/2016 | Heitz | ............ | E06B 3/308 |
| | | | | 16/250 |
| 2016/0370828 A1* | 12/2016 | Hsu | ............ | G06F 1/1681 |
| 2016/0370829 A1* | 12/2016 | Hsu | ............ | G06F 1/1681 |
| 2017/0064844 A1* | 3/2017 | Hsu | ............ | G02F 1/13 |
| 2018/0022521 A1* | 1/2018 | Wintz | ............ | B65D 63/04 |
| | | | | 24/27 |
| 2018/0092223 A1* | 3/2018 | Hsu | ............ | G06F 1/1652 |
| 2021/0014989 A1* | 1/2021 | Hsu | ............ | H05K 5/0017 |
| 2021/0199153 A1* | 7/2021 | Hsu | ............ | F16C 11/04 |
| 2021/0200275 A1* | 7/2021 | Hsu | ............ | G06F 1/1681 |
| 2021/0222729 A1* | 7/2021 | Hsu | ............ | E05D 1/00 |

FOREIGN PATENT DOCUMENTS

| | | |
|---|---|---|
| TW | M542918 U | 6/2017 |
| TW | M544190 U | 6/2017 |
| TW | M594719 U | 5/2020 |

* cited by examiner

ROTARY SHAFT LINK ASSEMBLY SHIELD STRUCTURE

BACKGROUND OF THE INVENTION

1. Field of the Invention

The present invention relates generally to a rotary shaft link assembly shield structure, and more particularly to a shield structure, which can always shield the connection sections of the respective rotary shaft components and effectively beautify the appearance.

2. Description of the Related Art

There are various electronic devices provided with upper covers or display screens, (such as mobile phones, notebooks, PDA and electronic books). The upper covers or display screens are pivotally assembled on the electronic devices via pivot pins or rotary shafts, whereby the upper covers or the display screens can be reciprocally rotated and opened/closed under external force. For example, Taiwanese Patent No. 97222022 "rotary shaft structure" and Taiwanese Patent No. 98207366 "pivot pin structure" provide typical embodiments.

In order to use the rotatable section (such as the screen) of the electronic device in more operation modes to widen the application range thereof, a conventional dual-shaft mechanism disposed between two pivoted modules has been developed, whereby the two modules can be rotated by different angles in accordance with different operation modes. For example, Taiwanese Patent No. 99211350 "dual-shaft hinge device", Taiwanese Patent No. 99225737 "biaxial hinge device" and U.S. Pat. No. 7,512,426 B2 "mobile communications device with synchronizing hinge" provide preferred embodiments.

In the above conventional pivot shaft structure, in consideration of the strength of the supporting structure and the smoothness of the operation, generally two sets of rotary shafts are respectively disposed on two sides of the pivoted sections of the ends/edges of the display module and the apparatus body module of an electronic apparatus (such as a notebook). Therefore, when operating and turning open the display module or the apparatus body module, the coordination between the rotary shafts is not idealistic. Also, the rotational freeness of the pivot shaft units disposed near the same central line is limited. As a result, in both the opening and closing rotation process of the entire electronic apparatus, the smoothness of operation is poorer.

In order to improve the above shortcoming, a conventional technique provides a pivot shaft device employing multiple rotational centers. For example, Taiwanese Patent No. 101224879 "multi-segment rotary shaft structure" and Taiwanese Patent No. 101224880 "plug-type multi-segment rotary shaft structure" provide substantial embodiments. The above references employ active joint assembly and driven joint assembly assembled with each other. A middle link plate assembly is disposed between the two opposite joint plates of the active joint assembly. In addition, the two opposite joint plates are provided with synchronous driving section connected with the middle link plate assembly. The driven joint assembly has two driven plates disposed between the two opposite joint plates of the active joint assembly. A shaft pin is assembled with the inner ends of the opposite joint plates corresponding to the outer ends of the driven plates. A shaft pin is assembled with the outer end of the middle link plate assembly corresponding to the inner ends of the driven plates. Accordingly, multiple active joint assemblies and driven joint assemblies are side-by-side arranged to together form a multi-segment rotary shaft structure.

However, in all the above conventional rotary shaft structures, the connection sections of the respective rotary shaft assemblies are directly exposed to outer side without any shielding mechanism. As a result, in use, when the two modules pivotally connected with each other are closed or opened, different extents of fissures or holes will be formed on the connection sections of the respective rotary shaft assemblies to cause dropped powder and oil leakage. More seriously, the appearance of the product is affected to lower the entire quality and competitive ability of the product.

It is therefore tried by the applicant to provide a rotary shaft link assembly shield structure to solve the problems existing in the conventional rotary shaft structures.

SUMMARY OF THE INVENTION

It is therefore a primary object of the present invention to provide a rotary shaft link assembly shield structure, which is connected between a first support and a second support of two articles. The rotary shaft link assembly structure has a rotary shaft assembly and at least one synchronous rotational assembly. The rotary shaft assembly has multiple connection members side-by-side arranged. Each connection member is formed with at least one hollow section in the sideward direction. The synchronous rotational assembly passes through the hollow sections of the connection members to respectively connect with the first and second supports, whereby the connection members are transversely serially connected to drivingly bend and connect along with the synchronous rotational assembly. The connection members respectively shield a part of the synchronous rotational assembly to provide a protection effect and reduce the dropped powder and oil leakage caused by the friction when the synchronous rotational assembly is rotated.

It is a further object of the present invention to provide the above rotary shaft link assembly shield structure, in which a flexible shield plate is disposed in the hollow sections of the respective connection members. One side of the flexible shield plate is secured to the first support (or the second support) to form a head end. A section of the flexible shield plate near the head end extends to shield one side of the synchronous rotational assembly. A middle section of the flexible shield plate passes through the second support (or the first support) to turn in reverse direction to shield the other side of the synchronous rotational assembly and extend to one side of the first support (or the second support) to form a tail end. Also, the hollow sections restrict two sides of the flexible shield plate to keep the flexible shield plate closely attaching to the synchronous rotational assembly. The tail end is movable so that when the synchronous rotational assembly is forcedly bent, the different length change of the upper and lower surfaces of the synchronous rotational assembly can be effectively absorbed so as to achieve a fully shielding effect for the synchronous rotational assembly and beautify the appearance.

To achieve the above and other objects, the rotary shaft link assembly structure of the present invention includes: a first support connected with a first article; a second support connected with a second article; a rotary shaft assembly having multiple connection members, the connection members being side-by-side disposed between the first and second supports, each connection member being correspondingly formed with at least one hollow section; a synchronous rotational assembly, which can be forcedly bent, the synchronous rotational assembly passing through the hollow sections of the respective connection members, the synchronous rotational assembly being respectively connected with the first and second supports, whereby the connection members are transversely serially connected and the connection members can respectively shield a part of the synchronous rotational assembly; and a flexible shield plate passing through the hollow sections of the respective connection members, a middle section of the flexible shield plate being bent in reverse direction and two sides of the flexible shield plate respectively shielding an upper surface and a lower surface of the synchronous rotational assembly.

In the above rotary shaft link assembly shield structure, two sides of the flexible shield plate are respectively formed with a head end and a tail end. The head end is secured to a surface of the first support (or the second support). The tail end extends to one side of the other surface of the first support (or the second support).

In the above rotary shaft link assembly shield structure, the rotary shaft assembly further has multiple spacer shaft rods. The spacer shaft rods are respectively serially disposed between the connection members. Each connection member has two arched channels respectively formed on two sides of an opening of the hollow section corresponding to the spacer shaft rod. The spacer shaft rods are held by the arched channels.

In the above rotary shaft link assembly shield structure, the spacer shaft rods are cylindrical bodies.

In the above rotary shaft link assembly shield structure, the synchronous rotational assembly is at least composed of a pivot shaft assembly and a toothed ring assembly. The pivot shaft assembly has multiple pivot shafts side-by-side arranged. The toothed ring assembly has multiple toothed rings partially engaged with each other. Each toothed ring is formed with two shaft holes in which two adjacent pivot shafts are pivotally fitted, whereby the toothed rings are sequentially engaged to connect the respective pivot shafts.

In the above rotary shaft link assembly shield structure, the synchronous rotational assembly has a connection seat and a connection component connected with two sides of the toothed ring assembly. The connection seat is securely connected on the first support (or the second support), the connection component being securely connected on the second support (or the first support).

The present invention can be best understood through the following description and accompanying drawings, wherein:

DETAILED DESCRIPTION OF THE PREFERRED EMBODIMENTS

Figure 1:
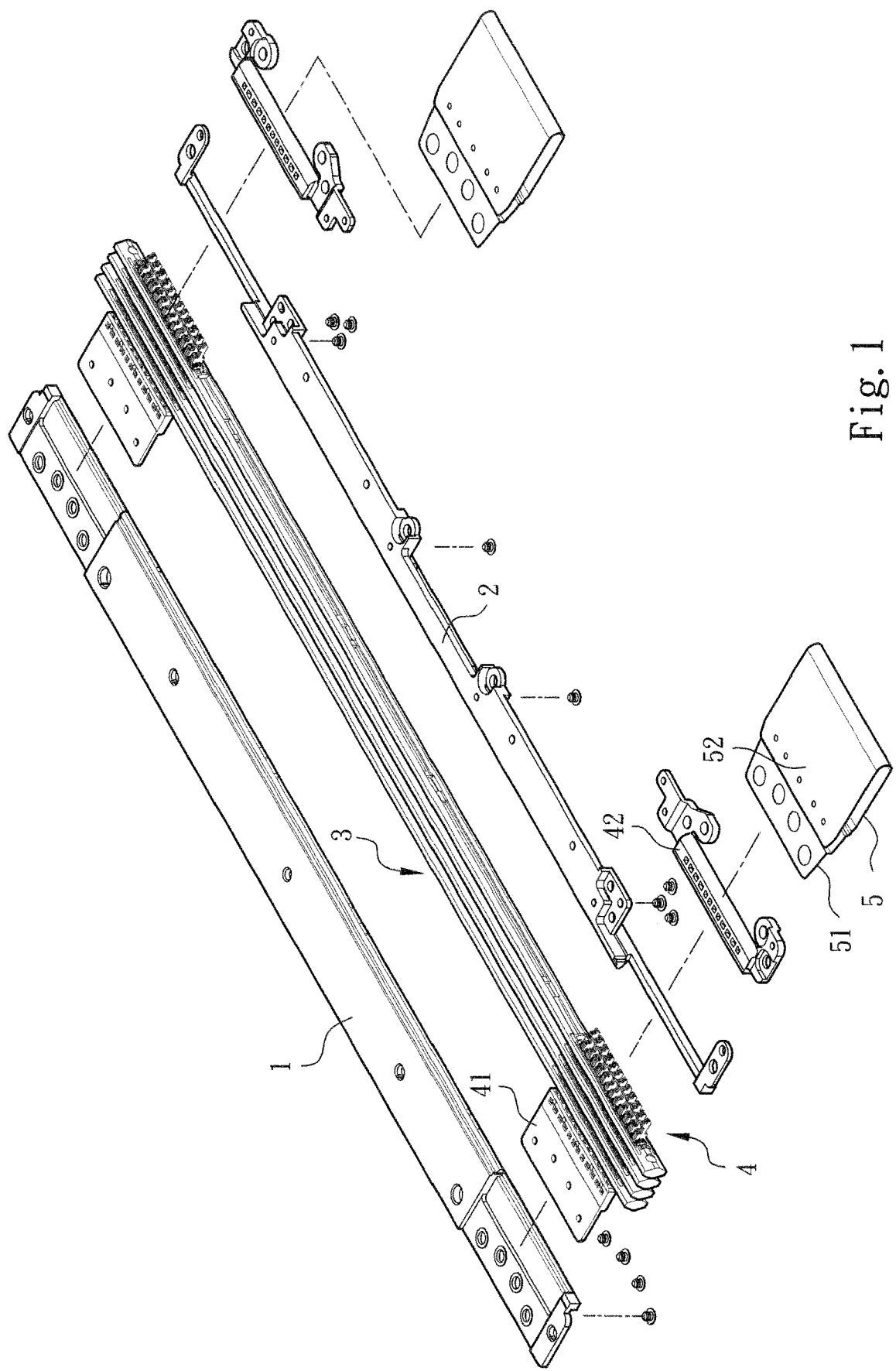
FIG. 1 is a perspective exploded view of the present invention.
Figure 2:
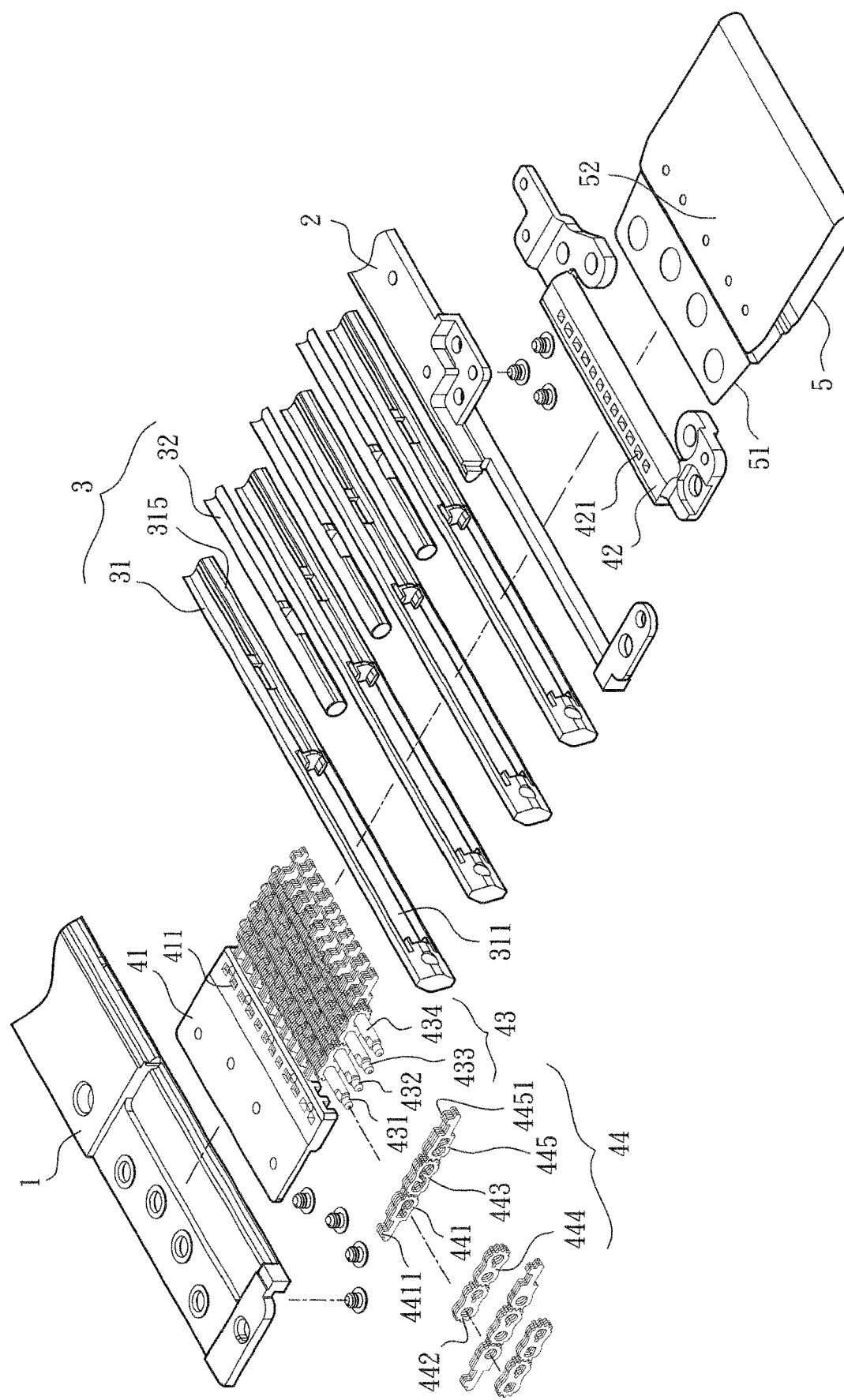
FIG. 2 is a perspective partially exploded view of the present invention.
Figure 3:
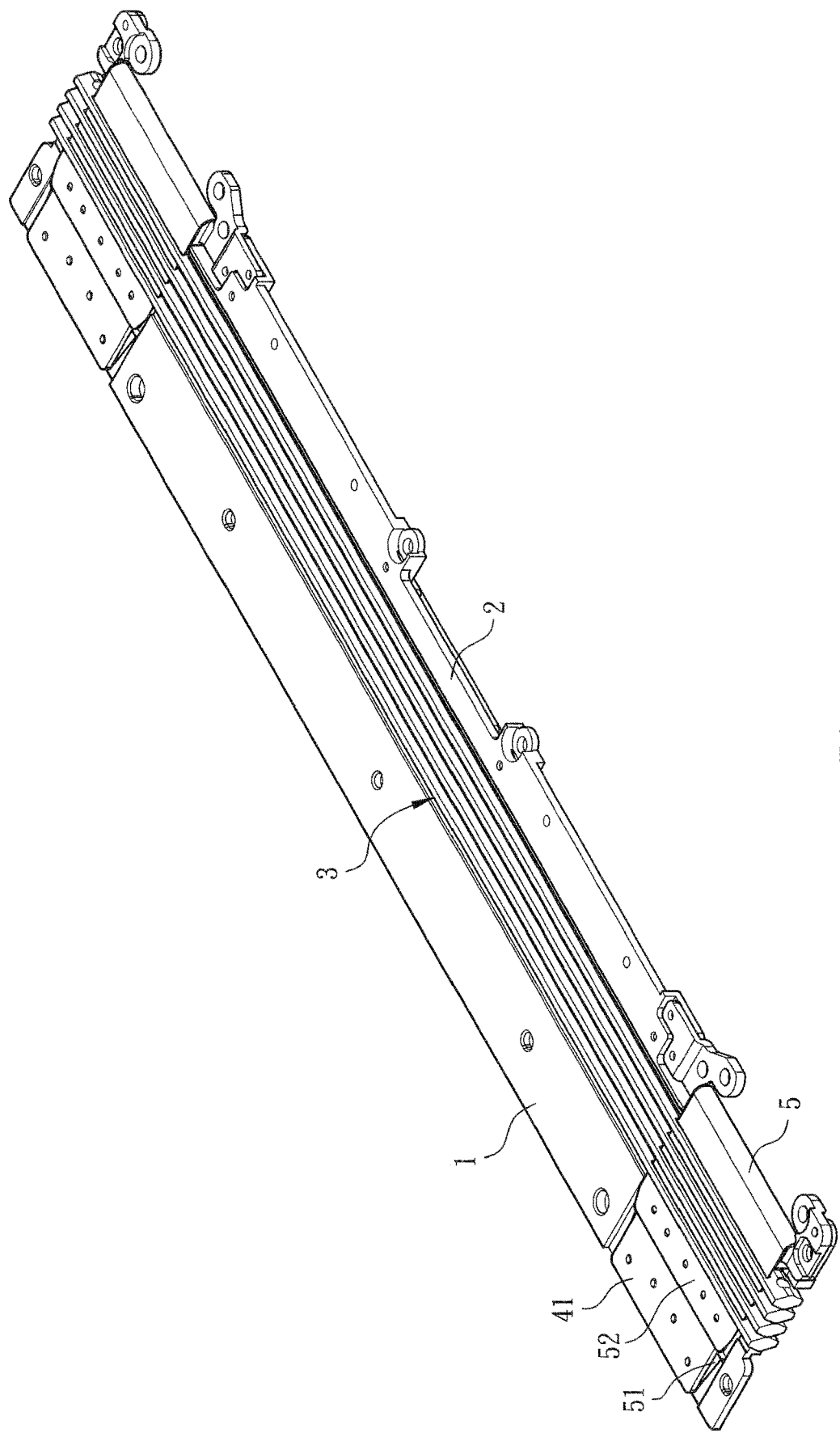
FIG. 3 is a perspective completely assembled view of the present invention.

Please refer to FIGS. 1 to 3. The rotary shaft link assembly shield structure of the present invention includes a first support 1, a second support 2, a rotary shaft assembly 3, a synchronous rotational assembly 4 and a flexible shield plate 5. The first support 1 is connected with a first article (not shown, can be a section of an electronic device). The second support 2 is connected with a second article (not shown, can be another section of the electronic device).

The rotary shaft assembly 3 is composed of multiple connection members 31 and multiple spacer shaft rods 32. The connection members 31 are side-by-side arranged between the first and second supports 1, 2. Each connection member 31 is correspondingly formed with at least one hollow section 311. Each connection member 31 has two arched channels 315 respectively formed on two sides of the opening of the hollow section 311.

The spacer shaft rods 32 are respectively attached to and sandwiched between the connection members 31. In a preferred embodiment, the spacer shaft rods 32 are cylindrical bodies. Two lateral sides of the spacer shaft rods 32 are respectively held by the arched channel s 315 of the adjacent connection members 31, whereby by means of the spacer shaft rods 32, the connection members 31 can smoothly rotate and displace.

The synchronous rotational assembly 4 passes through the hollow sections 311 of the connection members 31. Two sides of the synchronous rotational assembly 4 are respectively connected with the first and second supports 1, 2, whereby the connection members 31 are transversely serially connected. The connection members 31 can respectively shield a part of the synchronous rotational assembly 4. The synchronous rotational assembly 4 is composed of a connection seat 41, a connection component 42, a pivot shaft assembly 43 and a toothed ring assembly 44. One side of the connection seat 41 is connected with the first support 1. One side of the connection component 42 is connected with the second support 2.

The pivot shaft assembly 43 is composed of multiple pivot shafts side-by-side arranged between the first and second supports 1, 2. The toothed ring assembly 44 has multiple toothed rings partially engaged with each other. Each toothed ring is pivotally fitted on two adjacent pivot shafts, whereby the toothed rings are sequentially engaged to connect the respective pivot shafts.

In this embodiment, one side of the connection seat 41 distal from the first support 1 is formed with multiple sockets 411 and one side of the connection component 42 distal from the second support 2 is formed with multiple sockets 421. The pivot shaft assembly 43 has a first pivot shaft 431, a second pivot shaft 432, a third pivot shaft 433 and a fourth pivot shaft 434, which are side-by-side arranged. The toothed ring assembly 44 has a first toothed ring 441, a second toothed ring 442, a third toothed ring 443, a fourth toothed ring 444 and a fifth toothed ring 445, which are partially engaged with each other. The first, third and fifth toothed rings 441, 443, 445 are sequentially engaged with each other. The first toothed ring 441 is securely fitted on the first pivot shaft 431. A raised section 4411 is disposed on one side of the first toothed ring 441, which is securely connected in the socket 411 of the connection seat 41. The fifth toothed ring 445 is securely fitted on the fourth pivot shaft 434. A raised section 4451 is disposed on one side of the fifth toothed ring 445, which is securely connected in the socket 421 of the connection component 42. The third toothed ring 443 is engaged between the first and fifth toothed rings 441, 445. The third toothed ring 443 is securely fitted on the second and third pivot shafts 432, 433. The second and fourth toothed rings 442, 444 are engaged with each other. The second toothed ring 442 is securely fitted on the first and second pivot shafts 431, 432. The fourth toothed ring 444 is securely fitted on the third and fourth pivot shafts 433, 434.

By means of the first, second, third, fourth and fifth toothed rings 441, 442, 443, 444, 445, the first, second, third and fourth pivot shafts 431, 432, 433, 434 are synchronously rotatably connected with each other.

The flexible shield plate 5 is a bendable and flexible sheet passing through the hollow sections 311 of the respective connection members 31. Two sides of the flexible shield plate 5 are respectively formed with a head end 51 and a tail end 52. The head end 51 is secured to the first support 41 (or the second support 42). A section of the flexible shield plate 5 near the head end 51 shields an (upper) surface of the synchronous rotational assembly 4. A middle section of the flexible shield plate 5 passes through the second support 42 (or the first support 41) to bend in reverse direction and the tail end 52 extends to the other side of the first support 41 (or the second support 42). Also, a section of the flexible shield plate 5 near the tail end 52 shields the other (lower) surface of the synchronous rotational assembly 4.

Figure 4:
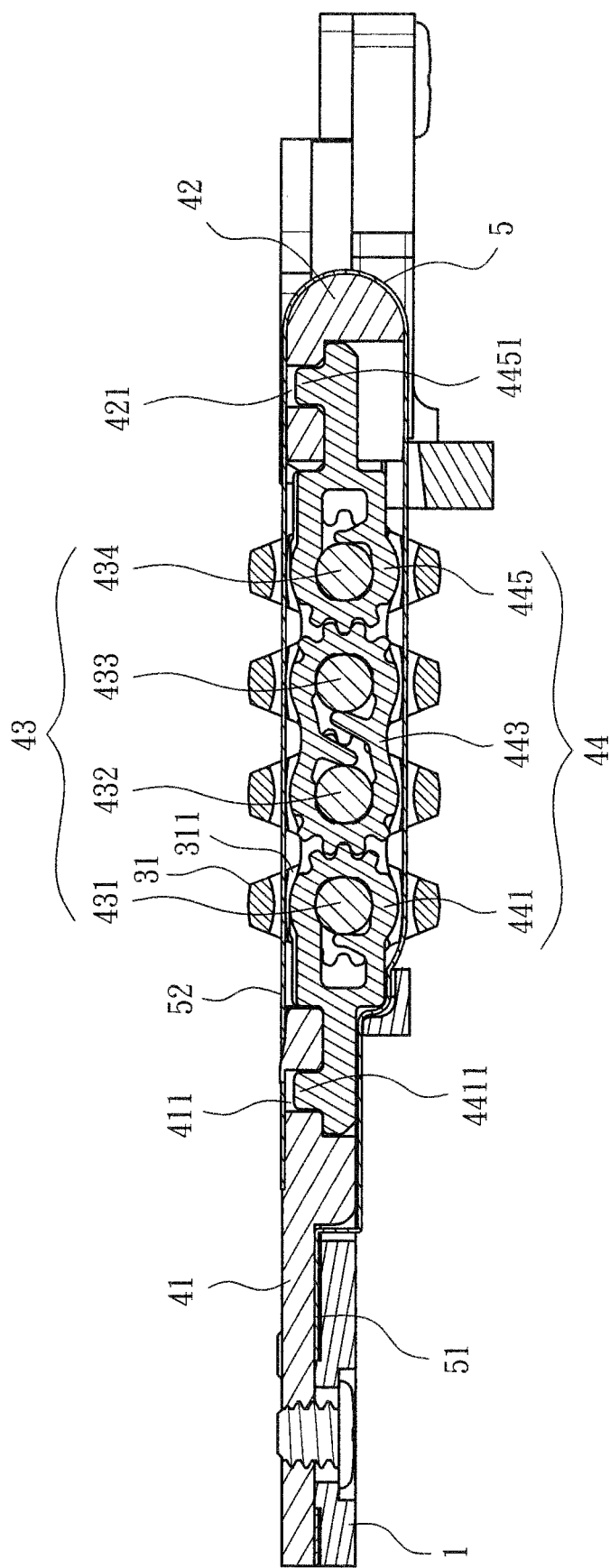
FIG. 4 is a side sectional completely assembled view of the present invention.
Figure 5:
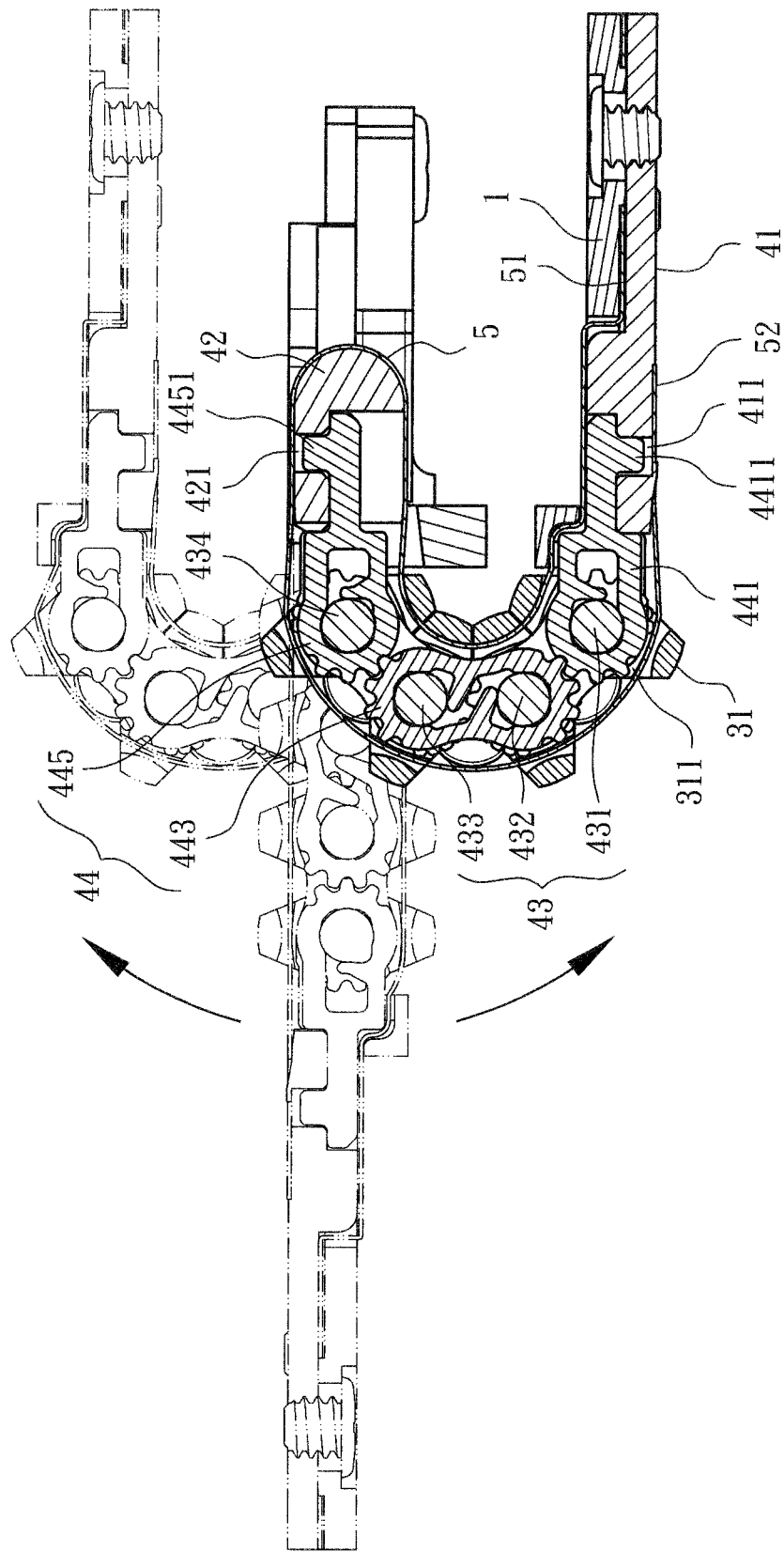
FIG. 5 is a sectional view showing the bending of the present invention.

Please refer to FIGS. 4 and 5. In use of the rotary shaft link assembly structure of the present invention, when the first and second supports 1, 2 are respectively forced and rotated, the force is transmitted to the toothed ring assembly 44 (or the toothed ring assembly 45) via the connection seat 41 and the connection component 42. Accordingly, the first, second, third and fourth pivot shafts 431, 432, 433, 434 of the pivot shaft assembly 43 can be synchronously forward/backward pivotally rotated and displaced via the first, second, third, fourth and fifth toothed rings 441, 442, 443, 444, 445 (or the first, second, third, fourth and fifth toothed rings 451, 452, 453, 454, 455, whereby the first and second articles can be opened/closed relative to each other.

During the pivotal rotation and displacement of the first, second, third and fourth pivot shafts 431, 432, 433, 434, the connection members 31 can respectively shield a part of the synchronous rotational assembly 4. Also, the hollow sections 311 can restrict two sides of the flexible shield plate 5 to keep the flexible shield plate 5 closely attaching to and shielding the synchronous rotational assembly 4. The tail end 52 is not fixed and is movable so that when bent, the different length change of the upper and lower surfaces of the synchronous rotational assembly 4 can be effectively absorbed so as to achieve a fully shielding effect for the synchronous rotational assembly 4. This not only provides a full enclosing/protection effect, but also totally avoids the dropped powder and oil leakage caused by the friction of the synchronous rotational assembly 4.

In conclusion, the rotary shaft link assembly shield structure of the present invention can truly shield the connection sections of the rotary shaft assembly so as to effectively beautify the appearance of the product. The rotary shaft link assembly shield structure of the present invention is inventive and advanced.

The above embodiments are only used to illustrate the present invention, not intended to limit the scope thereof. Many modifications of the above embodiments can be made without departing from the spirit of the present invention.

What is claimed is:

1. A rotary shaft link assembly shield structure comprising:
    a first support connected with a first article;
    a second support connected with a second article;
    a rotary shaft assembly having multiple connection members, the connection members being side-by-side disposed between the first and second supports, each connection member being correspondingly formed with at least one hollow section;
    a synchronous rotational assembly, which can be forcedly bent, the synchronous rotational assembly passing through the hollow sections of the respective connection members, the synchronous rotational assembly being respectively connected with the first and second supports, whereby the connection members are transversely serially connected and the connection members can respectively shield a part of the synchronous rotational assembly; and
    a flexible shield plate passing through the hollow sections of the respective connection members, a middle section of the flexible shield plate being bent in reverse direction and two sides of the flexible shield plate respectively shielding an upper surface and a lower surface of the synchronous rotational assembly.

2. The rotary shaft link assembly shield structure as claimed in claim 1, wherein two sides of the flexible shield plate are respectively formed with a head end and a tail end, the head end being secured to a surface of the first support, the tail end extending to one side of the other surface of the first support.

3. The rotary shaft link assembly shield structure as claimed in claim 1, wherein the rotary shaft assembly further has multiple spacer shaft rods, the spacer shaft rods being respectively disposed between the connection members, each connection member having two arched channels respectively formed on two sides of an opening of the hollow section corresponding to the spacer shaft rod, the spacer shaft rods being held by the arched channels.

4. The rotary shaft link assembly shield structure as claimed in claim 2, wherein the rotary shaft assembly further has multiple spacer shaft rods, the spacer shaft rods being respectively disposed between the connection members, each connection member having two arched channels respectively formed on two sides of an opening of the hollow section corresponding to the spacer shaft rod, the spacer shaft rods being held by the arched channels.

5. The rotary shaft link assembly shield structure as claimed in claim 3, wherein the spacer shaft rods are cylindrical bodies.

6. The rotary shaft link assembly shield structure as claimed in claim 4, wherein the spacer shaft rods are cylindrical bodies.

7. The rotary shaft link assembly shield structure as claimed in claim 1, wherein the synchronous rotational assembly is at least composed of a pivot shaft assembly and a toothed ring assembly, the pivot shaft assembly having multiple pivot shafts side-by-side arranged, the toothed ring assembly having multiple toothed rings partially engaged with each other, each toothed ring being formed with two shaft holes in which two adjacent pivot shafts are pivotally fitted, whereby the toothed rings are sequentially engaged to connect the respective pivot shafts.

8. The rotary shaft link assembly shield structure as claimed in claim 2, wherein the synchronous rotational assembly is at least composed of a pivot shaft assembly and a toothed ring assembly, the pivot shaft assembly having multiple pivot shafts side-by-side arranged, the toothed ring assembly having multiple toothed rings partially engaged with each other, each toothed ring being formed with two shaft holes in which two adjacent pivot shafts are pivotally fitted, whereby the toothed rings are sequentially engaged to connect the respective pivot shafts.

9. The rotary shaft link assembly shield structure as claimed in claim 3, wherein the synchronous rotational assembly is at least composed of a pivot shaft assembly and a toothed ring assembly, the pivot shaft assembly having multiple pivot shafts side-by-side arranged, the toothed ring assembly having multiple toothed rings partially engaged with each other, each toothed ring being formed with two shaft holes in which two adjacent pivot shafts are pivotally fitted, whereby the toothed rings are sequentially engaged to connect the respective pivot shafts.

10. The rotary shaft link assembly shield structure as claimed in claim 4, wherein the synchronous rotational assembly is at least composed of a pivot shaft assembly and a toothed ring assembly, the pivot shaft assembly having multiple pivot shafts side-by-side arranged, the toothed ring assembly having multiple toothed rings partially engaged with each other, each toothed ring being formed with two shaft holes in which two adjacent pivot shafts are pivotally fitted, whereby the toothed rings are sequentially engaged to connect the respective pivot shafts.

11. The rotary shaft link assembly shield structure as claimed in claim 7, wherein the synchronous rotational assembly has a connection seat and a connection component connected with two sides of the toothed ring assembly, the connection seat being securely connected on the first support, the connection component being securely connected on the second support.

12. The rotary shaft link assembly shield structure as claimed in claim 8, wherein the synchronous rotational assembly has a connection seat and a connection component connected with two sides of the toothed ring assembly, the connection seat being securely connected on the first support, the connection component being securely connected on the second support.

13. The rotary shaft link assembly shield structure as claimed in claim 9, wherein the synchronous rotational assembly has a connection seat and a connection component connected with two sides of the toothed ring assembly, the connection seat being securely connected on the first support, the connection component being securely connected on the second support.

14. The rotary shaft link assembly shield structure as claimed in claim 10, wherein the synchronous rotational assembly has a connection seat and a connection component connected with two sides of the toothed ring assembly, the connection seat being securely connected on the first support, the connection component being securely connected on the second support.

* * * * *